Figure 1:
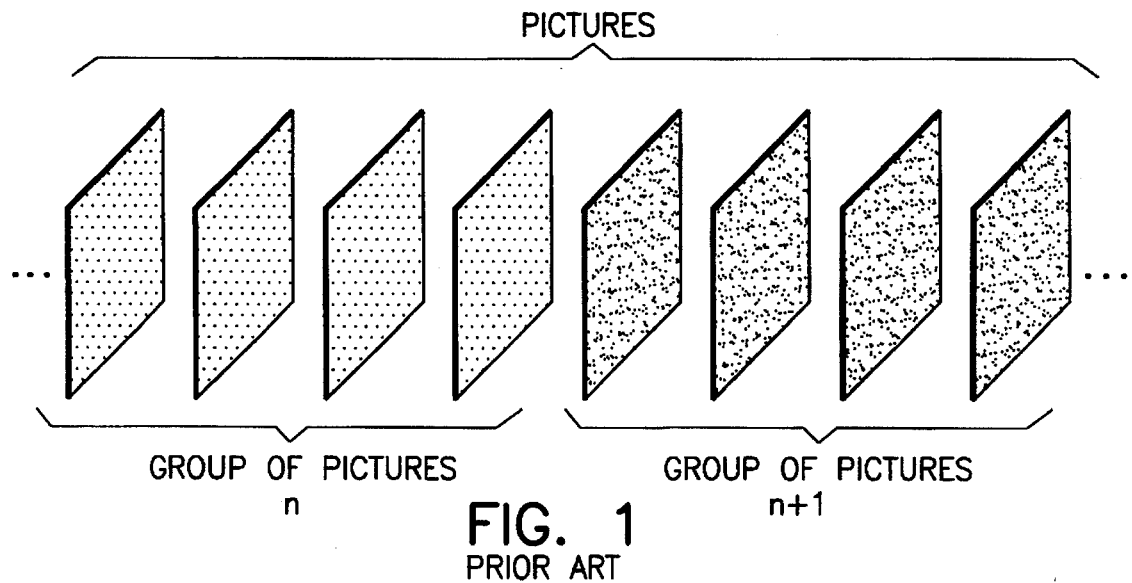

United States Patent [19]
Gonzales et al.

[11] Patent Number: 5,652,629
[45] Date of Patent: Jul. 29, 1997

[54] BIDIRECTIONAL MOTION ESTIMATION IN A MOTION VIDEO COMPRESSION SYSTEM

[75] Inventors: Cesar Augusto Gonzales, Katonah; Xiaoming Li, Yorktown Heights; Elliot Neil Linzer, Bronx, all of N.Y.

[73] Assignee: International Business Machines Corporation, Armonk, N.Y.

[21] Appl. No.: 527,140

[22] Filed: Sep. 12, 1995

[51] Int. Cl.$^6$ .............................. H04N 7/36; H04N 7/50
[52] U.S. Cl. ............................. 348/699; 348/407
[58] Field of Search ............................. 348/699, 402, 348/407, 413, 416; H04N 7/36, 7/50

[56] References Cited

U.S. PATENT DOCUMENTS 5,091,782  2/1992  Krause ........................ 348/402
5,231,484  7/1993  Gonzales ..................... 348/407

*Primary Examiner*—Howard W. Britton
*Attorney, Agent, or Firm*—Richard M. Ludwin

[57] ABSTRACT

A system and methods for implementing an encoder suitable for use with the motion picture compression. The system includes a motion estimation apparatus which performs temporally interpolative motion estimation. The temporally interpolative motion estimation is performed by first performing unidirectional motion estimation between the current picture and one or more other pictures. The results of the unidirectional motion estimation alone, and not any picture data, are used to perform temporally interpolative motion estimation.

10 Claims, 8 Drawing Sheets

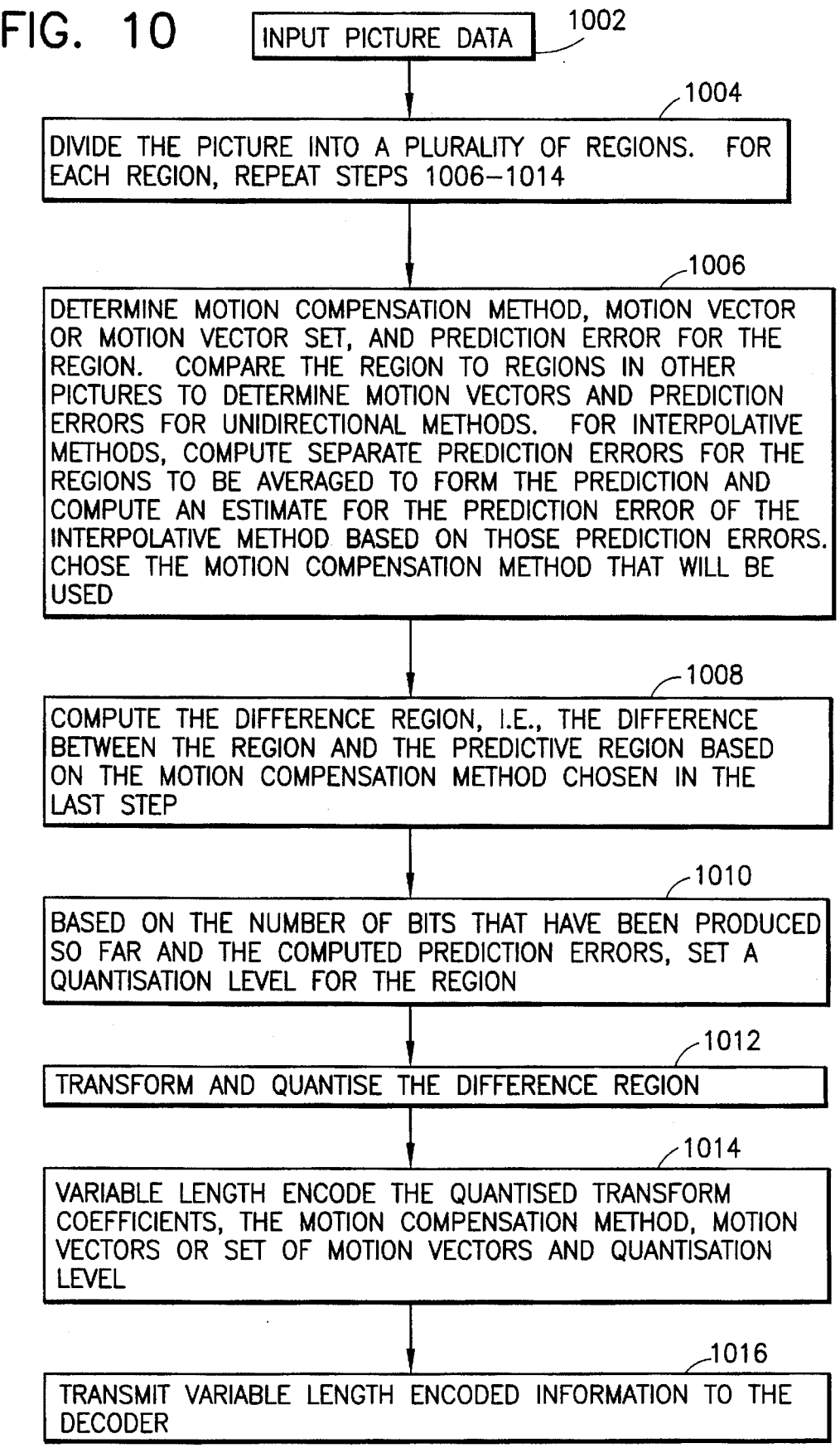

BIDIRECTIONAL MOTION ESTIMATION IN A MOTION VIDEO COMPRESSION SYSTEM

I. BACKGROUND OF THE INVENTION a. Field of the Invention

The present invention relates to the field of data compression and, more particularly, to a system and techniques for compressing digital motion video signals.

b. Related Art

Technological advances in digital transmission networks, digital storage media, very Large Scale Integration devices, and digital processing of video and audio signals are converging to make the transmission and storage of digital video economical in a wide variety of applications. Because the storage and transmission of digital video signals is central to many applications, and because an uncompressed representation of a video signal requires a large amount of storage, the use of digital video compression techniques is vital to this advancing art. In this regard, several international standards for the compression of digital video signals have emerged over the past decade, with more currently under development. These standards apply to algorithms for the transmission and storage of compressed digital video in a variety of applications, including: video-telephony and teleconferencing; high quality digital television transmission on coaxial and fiber-optic networks as well as broadcast terrestrially and over direct broadcast satellites; and in interactive multimedia products on CD-ROM, Digital Audio Tape, and Winchester disk drives.

Several of these standards involve algorithms based on a common core of compression techniques, e.g., the CCITT (Consultative Committee on International Telegraphy and Telephony) Recommendation H.120, the CCITT Recommendation H.261, and the ISO/IEC MPEG-1 and MPEG-2 standards. The MPEG algorithms have been developed by the Moving Picture Experts Group (MPEG), part of a joint technical committee of the International Standards Organization (ISO) and the International Electrotechnical Commission (IEC). The MPEG committee has been developing standards for the multiplexed, compressed representation of video and associated audio signals. The standard specifies the syntax of the compressed bit stream and the method of decoding, but leave considerable latitude for novelty and variety in the algorithm employed in the encoder.

Both the MPEG-1 and MPEG-2 algorithms can be described as hybrid transform encoding/motion compensation encoders. For an encoder to efficiently use motion compensation, it must perform a task called motion estimation. Also, motion estimation may be useful for rate control.

Motion estimation can be described in general terms as deciding where a particular region in a picture "came from" in a picture or pictures that occur temporal earlier or later in time and deciding how accurately a region of the current can be said to "come from" other pictures. If the encoder is comparing a single picture that occurs earlier or later in time then the current picture, we say that the encoder is doing unidirectional motion estimation. If the encoder tries to see how a region in the current picture "came from" more than one picture, we say that it is doing temporally interpolative motion estimation.

Motion estimation is one of the most computationally intensive tasks that an MPEG-1 or MPEG-2 encoder performs. Thus, an important consideration in building an MPEG-1 or MPEG-2 encoder is to use an economical motion estimation scheme.

II. SUMMARY OF THE INVENTION

The present invention involves a system and method for performing motion estimation. Motion vectors and prediction errors are computed for at least one unidirectional motion compensation method, for each of a plurality of regions in a picture to be encoded. From the prediction errors an estimate for at least one interpolative motion compensation method is computed. Based on the above, the motion compensation method and at least one motion vector for use in encoding are selected.

Advantageously, the present invention can be implemented an encoder suitable for use with the ISO/IEC MPEG-2 standards.

III. BRIEF DESCRIPTION OF THE DRAWINGS

FIG. 1: Exemplary pair of Groups of Pictures (GOP's).

Figure 2:
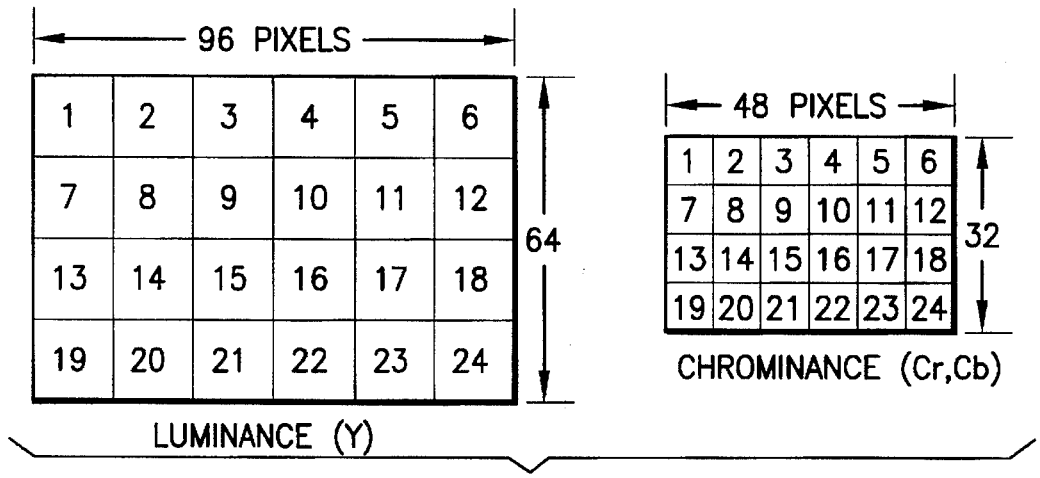

FIG. 2: Exemplary macroblock (MB) subdivision of a picture (for 4:2:0 format).

Figure 3:
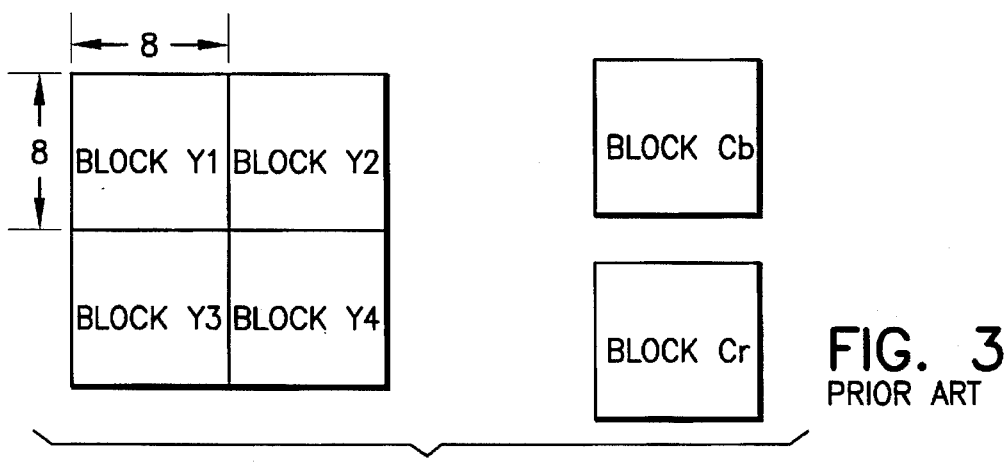

FIG. 3: Block subdivision of a macroblock (for 4:2:0 format).

Figure 4:
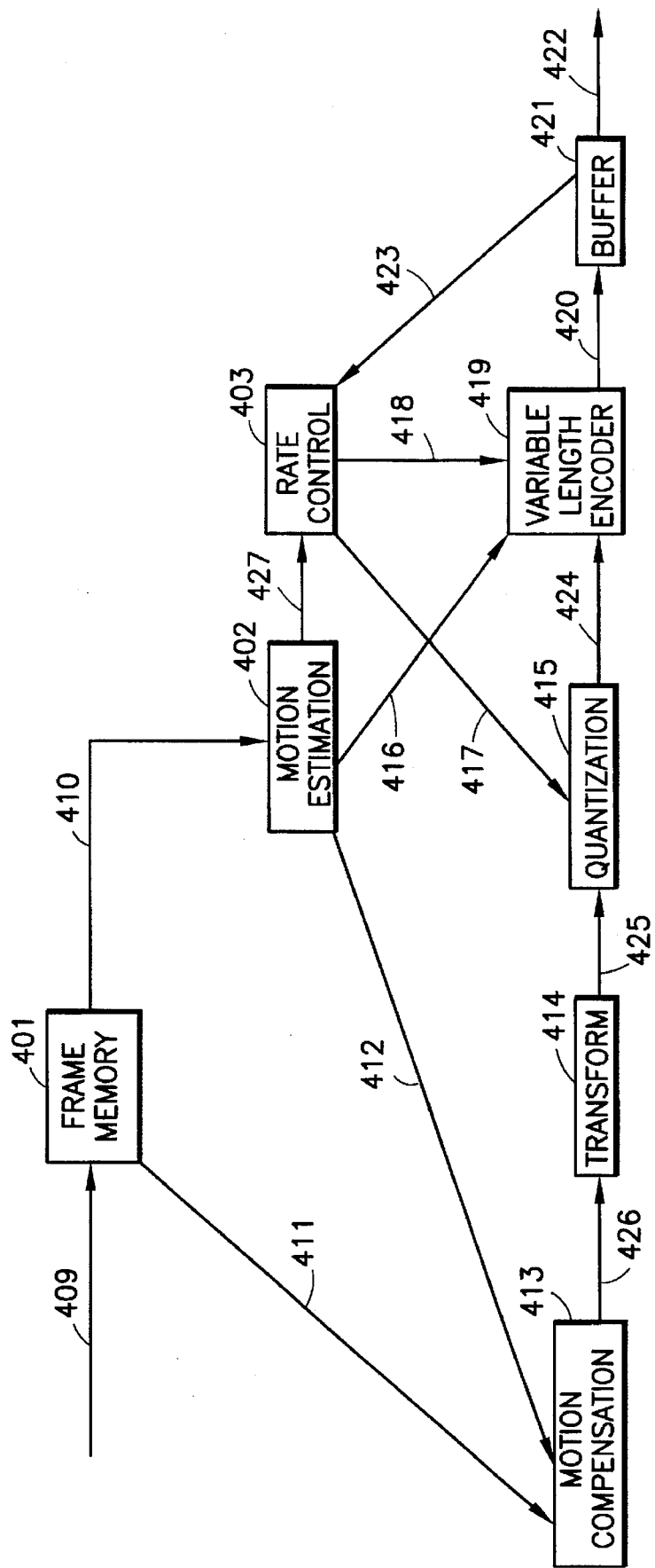

FIG. 4: Block diagram of a video encoder.

Figure 5:
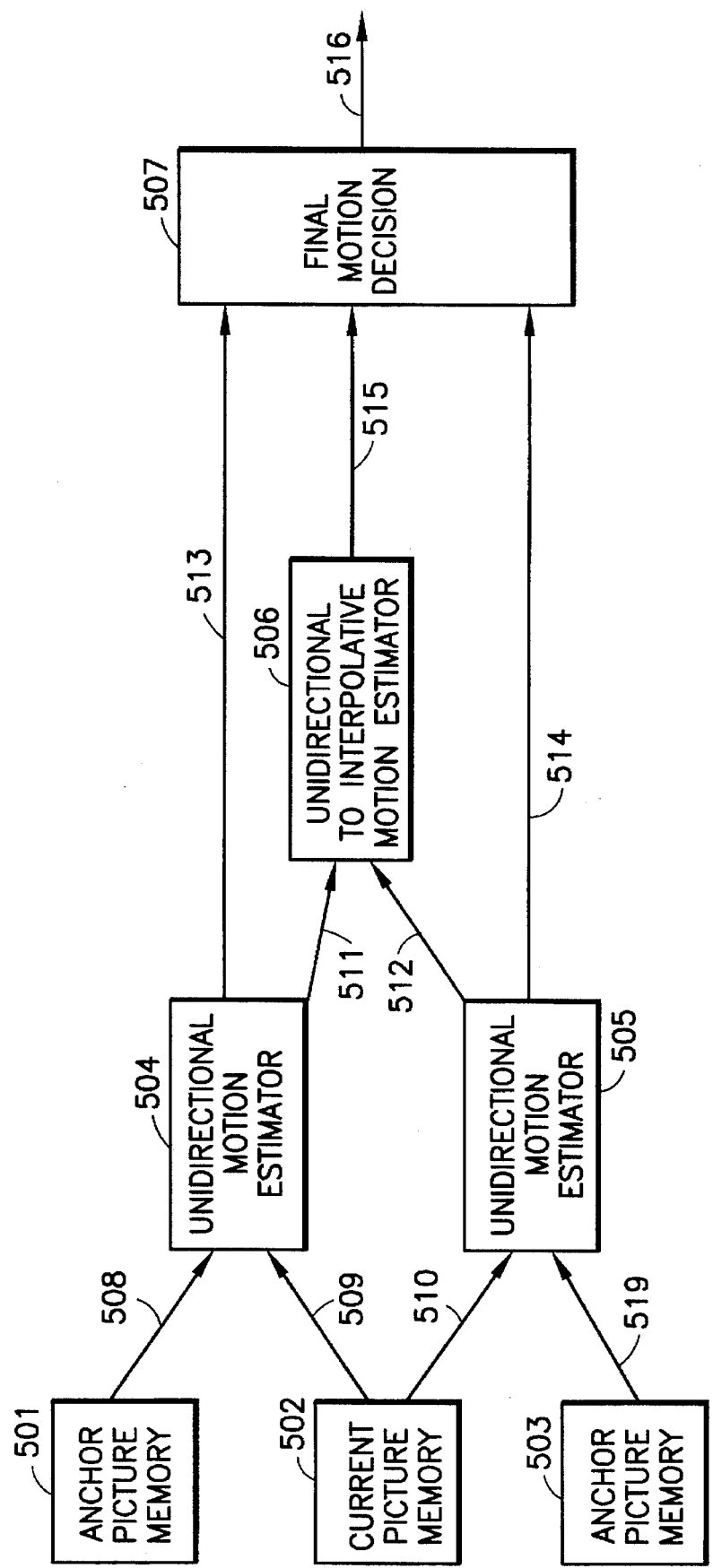

FIG. 5: Block diagram of a motion estimation unit according to this invention.

Figure 6:
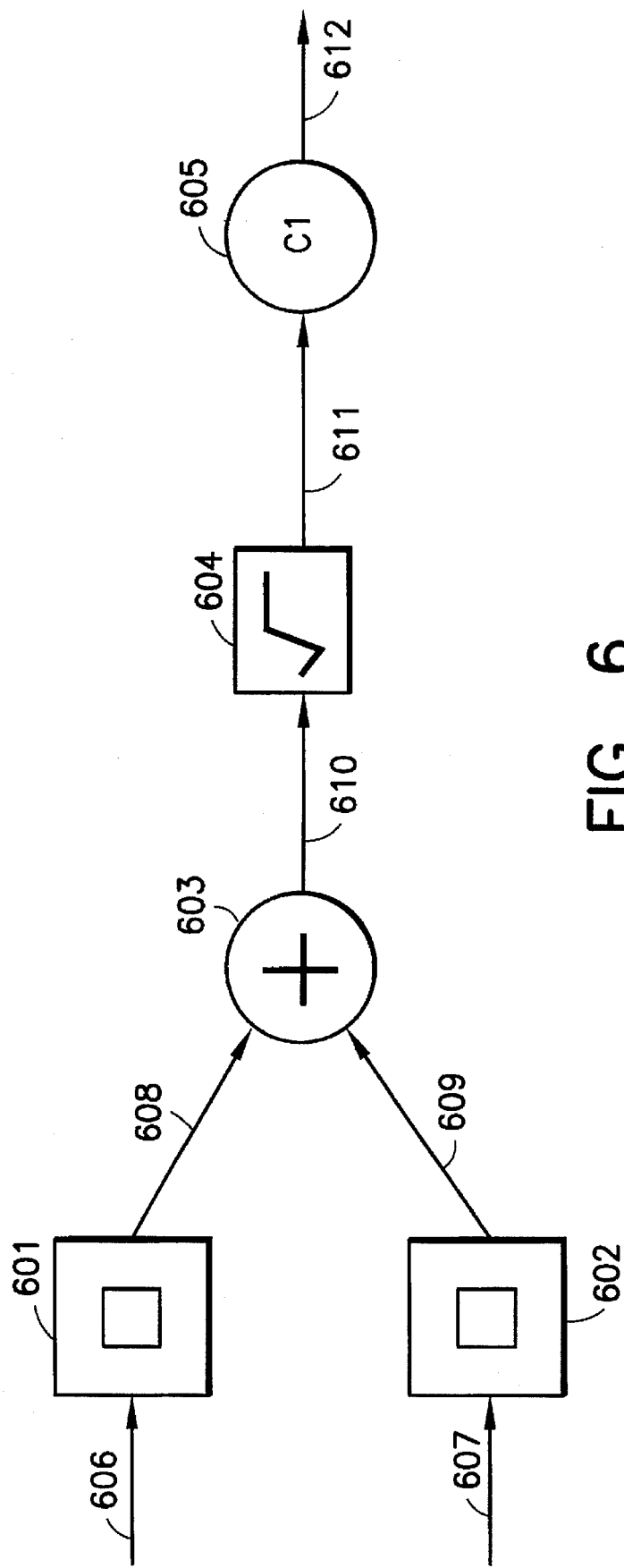

FIG. 6: Block diagram of a first embodiment of the unidirectional to interpolative motion estimator of FIG. 5.

Figure 7:
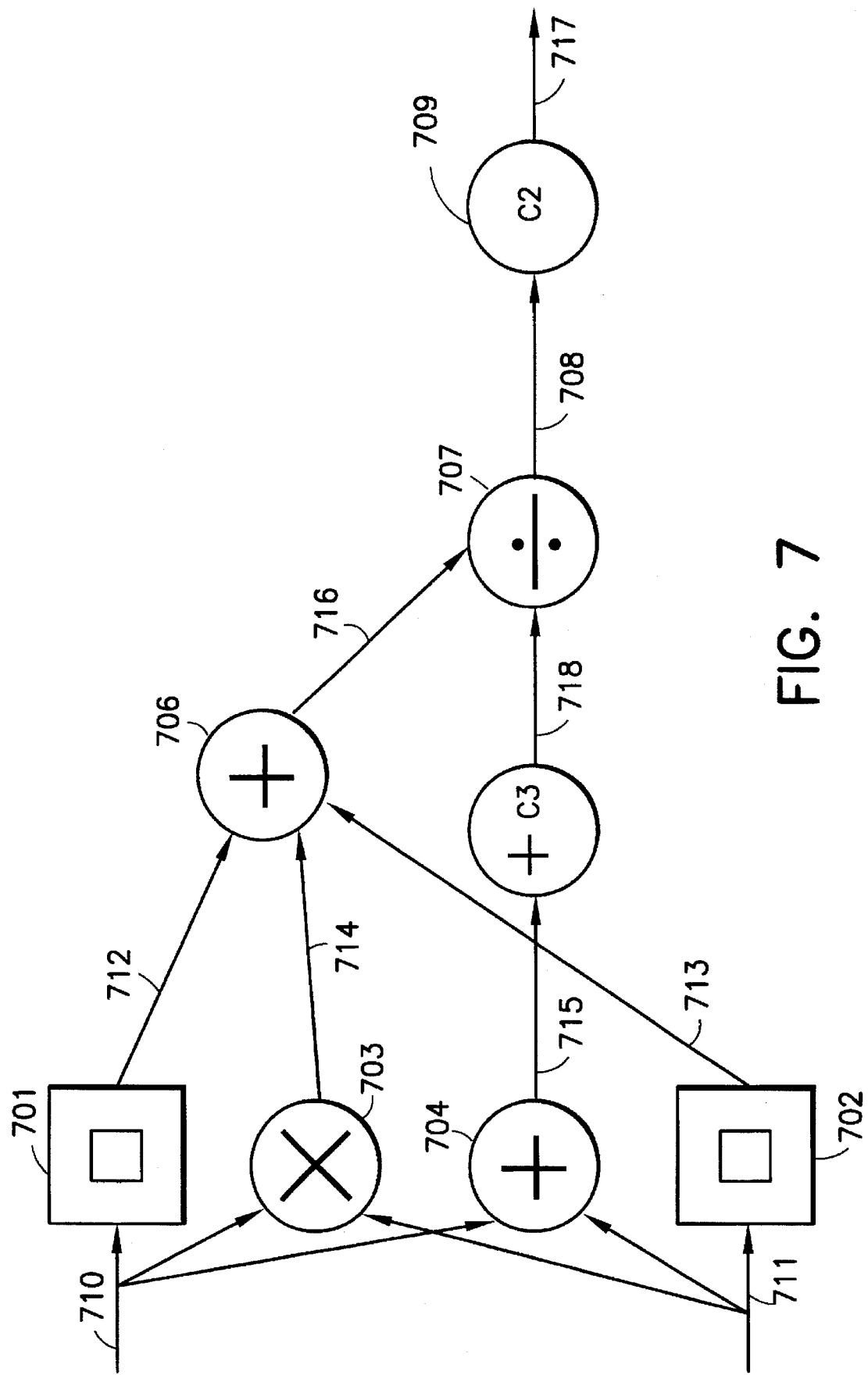

FIG. 7: Block diagram of a second embodiment of the unidirectional to interpolative motion estimator of FIG. 5.

Figure 8:
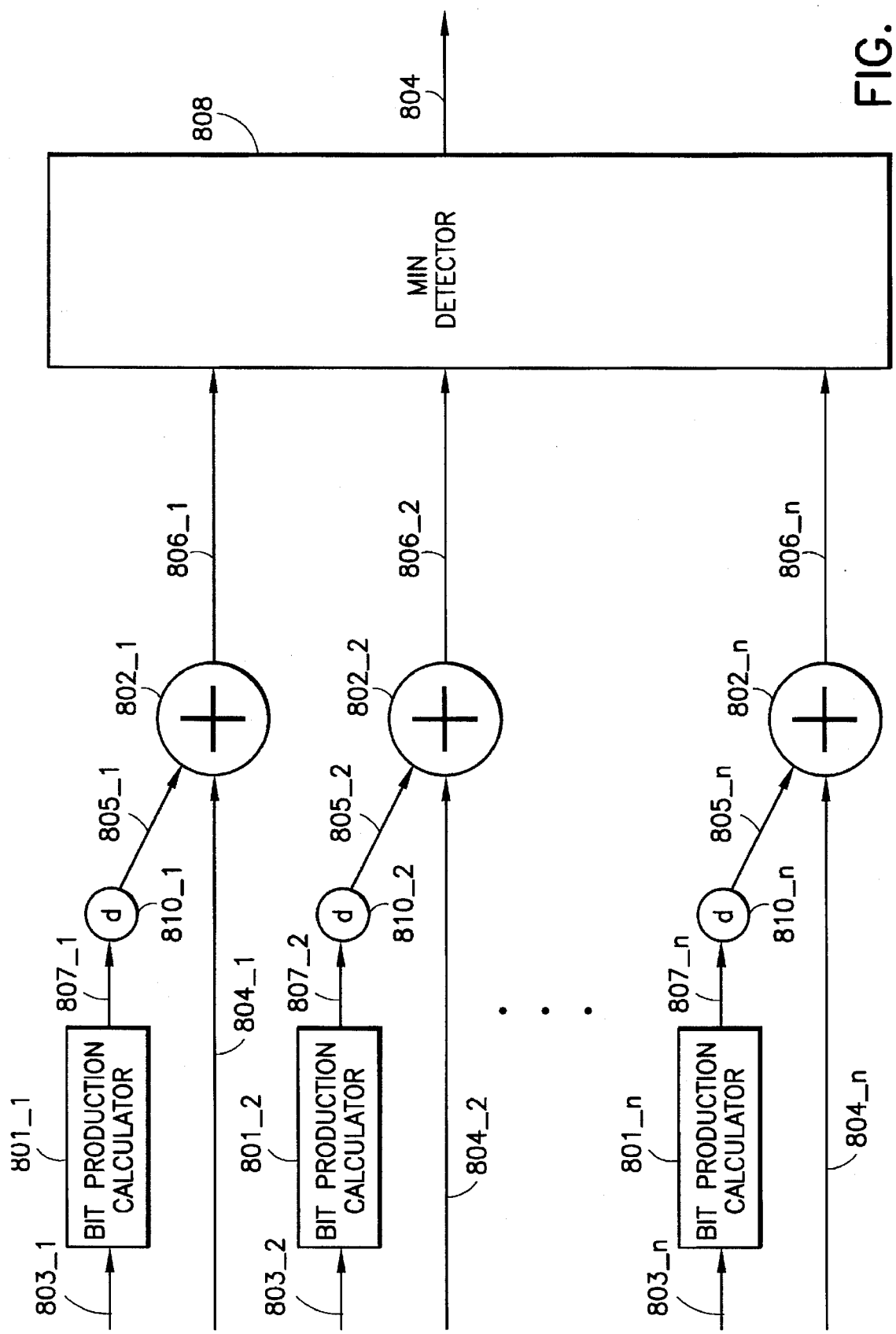

FIG. 8: Block diagram of an embodiment of the final motion decision apparatus of FIG. 5.

Figure 9:
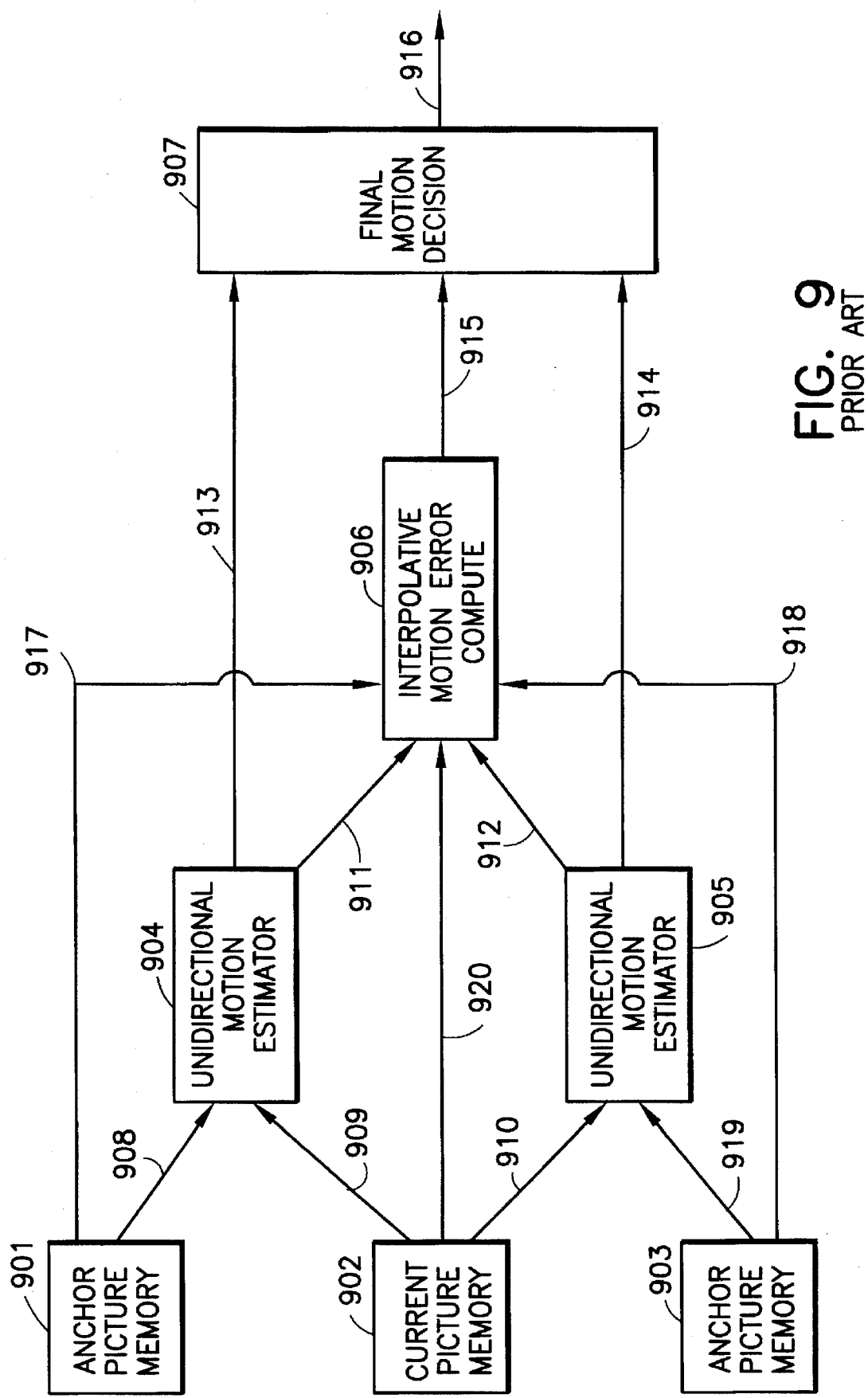

FIG. 9: Block diagram of a conventional motion estimation unit.

FIG. 10: An overview of a coding method in accordance with the principles of the present invention.

IV. DETAILED DESCRIPTION OF THE PREFERRED EMBODIMENTS a. THE MPEG-2 ENVIRONMENT

As the present invention may be applied in connection with an MPEG-2 encoder, in order to facilitate the understanding of the invention, some pertinent aspects of the MPEG-2 compression algorithm will be reviewed. It is to be noted, however, that the invention can also be applied to other video coding algorithms which share some of the features of the MPEG algorithms.

To begin with, it will be understood that the compression of any data object, such as a page of text, an image, a segment of speech, or a video sequence, can be thought of as a series of steps, including: 1) a decomposition of that object into a collection of tokens; 2) the representation of those tokens by binary strings which have minimal length in some sense; and 3) the concatenation of the strings in a well-defined order. Steps 2 and 3 are lossless, i.e., the original data is faithfully recoverable upon reversal, and Step 2 is known as entropy coding. Step 1 can be either lossless or lossy in general. Most video compression algorithms are lossy because of stringent bit-rate requirements. A successful lossy compression algorithm eliminates redundant and irrelevant information, allowing relatively large errors where they are not likely to be visually significant and carefully representing aspects of a sequence to which the human observer is very sensitive. The techniques employed in the MPEG-2 algorithm for Step 1 can be described as predictive/interpolative motion-compensated hybrid DCT/

DPCM coding. Huffman coding, also known as variable length coding, is used in Step 2. Although, as mentioned, the MPEG-2 standard is really a specification of the decoder and the compressed bit stream syntax, the following description of the MPEG-2 specification is, for ease of presentation, primarily from an encoder point of view.

The MPEG-2 video standard specifies a coded representation of video for transmission as set forth in ISO-IEC JTC1/SC29/WG11, Generic Coding of Moving Pictures and Associated Audio Information: Video, International Standard, 1994. The algorithm is designed to operate on interlaced or noninterlaced component video. Each picture has three components: luminance (Y), red color difference ($C_r$), and blue color difference ($C_b$). The video data may be coded in 4:4:4 format, in which case there is one $C_r$ and one $C_b$ sample for each Y sample, in 4:2:2 format, in which case there are half as many $C_r$ and $C_b$ samples as luminance samples in the horizontal direction, or in 4:2:0 format, in which case there are half as many $C_r$ and $C_b$ samples as luminance samples in both the horizontal and vertical directions.

An MPEG-2 data stream consists of a video stream and an audio stream which are packed, together with systems information and possibly other bitstreams, into a systems data stream that can be regarded as layered. Within the video layer of the MPEG-2 data stream, the compressed data is further layered. A description of the organization of the layers will aid in understanding the invention. These layers of the MPEG-2 Video Layered Structure are shown in FIGS. 1–3. The layers pertain to the operation of the compression algorithm as well as the composition of a compressed bit stream. The highest layer is the video Sequence Layer, containing control information and parameters for the entire sequence. At the next layer, a sequence is subdivided into sets of consecutive pictures, each known as a "Group of Pictures" (GOP). A general illustration of this layer is shown in FIG. 1. Decoding may begin at the start of any GOP, essentially independent of the preceding GOP's. There is no limit to the number of pictures which may be in a GOP, nor do there have to be equal numbers of pictures in all GOP's.

The third or Picture layer is a single picture. A general illustration of this layer is shown in FIG. 2. The luminance component of each picture is subdivided into 16×16 regions; the color difference components are subdivided into appropriately sized blocks spatially co-sited with the 16×16 luminance regions; for 4:4:4 video, the color difference components are 16×16, for 4:2:2 video, the color difference components are 8×16, and for 4:2:0 video, the color difference components are 8×8. Taken together, these co-sited luminance region and color difference regions make up the fifth layer, known as a "macroblock" (MB). Macroblocks in a picture are numbered consecutively in lexicographic order, starting with Macroblock 1.

Between the Picture and MB layers is the fourth or "slice" layer. Each slice consists of some number of consecutive MB's. Finally, each MB consists of four 8×8 luminance blocks and 8, 4, or 2 (for 4:4:4, 4:2:2 and 4:2:0 video) chrominance blocks. The Sequence, GOP, Picture, and slice layers all have headers associated with them. The headers begin with byte-aligned Start Codes and contain information pertinent to the data contained in the corresponding layer.

A picture can be either field-structured or frame-structured. A frame-structured picture contains information to reconstruct an entire frame, i.e., the combination of one field containing the odd lines and the other field containing the even lines. A field-structured picture contains information to reconstruct one field. If the width of each luminance frame (in picture elements or pixels) is denoted as C and the height as R (C is for columns, R is for rows), a frame-structured picture contains information for C×R pixels and a field-structured picture contains information for C×R/2 pixels.

A macroblock in a field-structured picture contains a 16×16 pixel segment from a single field. A macroblock in a frame-structured picture contains a 16×16 pixel segment from the frame that both fields compose; each macroblock contains a 16×8 region from each of the two fields.

Within a GOP, three types of pictures can appear. The distinguishing difference among the picture types is the compression method used. The first type, Intramode pictures or I-pictures, are compressed independently of any other picture. Although there is no fixed upper bound on the distance between I-pictures, it is expected that they will be interspersed frequently throughout a sequence to facilitate random access and other special modes of operation. Predictively motion-compensated pictures (P pictures) are reconstructed from the compressed data in that picture plus two reconstructed fields from previously displayed I or P pictures. Bidirectionally motion-compensated pictures (B pictures) are reconstructed from the compressed data in that picture plus two reconstructed fields from previously displayed I or P pictures and two reconstructed fields from I or P pictures that will be displayed in the future. Because reconstructed I or P pictures can be used to reconstruct other pictures, they are called anchor pictures.

A common compression technique is transform coding. In MPEG-2 and several other compression standards, the discrete cosine transform (DCT) is the transform of choice. The compression of an I-picture is achieved by the steps of 1) taking the DCT of blocks of pixels, 2) quantizing the DCT coefficients, and 3) Huffman coding the result. In MPEG-2, the DCT operation converts a block of n×n pixels into an n×n set of transform coefficients. Like several of the international compression standards, the MPEG-2 algorithm uses a DCT block size of 8×8. The DCT transformation by itself is a lossless operation, which can be inverted to within the precision of the computing device and the algorithm with which it is performed.

The second step, quantization of the DCT coefficients, is the primary source of lossiness in the MPEG-2 algorithm. Denoting the elements of the two-dimensional array of DCT coefficients by $c_{mn}$, where m and n can range from 0 to 7, aside from truncation or rounding corrections, quantization is achieved by dividing each DCT coefficient $c_{mn}$ by $w_{mn}$ times QP, with $w_{mn}$ being a weighting factor and QP being the quantiser parameter. The weighting factor $w_{mn}$ allows coarser quantization to be applied to the less visually significant coefficients. The quantiser parameter QP is the primary means of trading off quality vs. bit-rate in MPEG-2. It is important to note that QP can vary from MB to MB within a picture.

Following quantization, the DCT coefficient information for each MB is organized and coded, using a set of Huffman codes. As the details of this step are not essential to an understanding of the invention and are generally understood in the art, no further description will be offered here.

Most video sequences exhibit a high degree of correlation between consecutive pictures. A useful method to remove this redundancy prior to coding a picture is "motion compensation". MPEG-2 provides tools for several methods of motion compensation (described below).

Many methods of motion compensation have the following in common. For each macroblock, one or more motion vectors are encoded in the bit stream. These motion vectors allow the decoder to reconstruct a macroblock, called the predictive macroblock. The encoder subtracts the "predictive" macroblock from the macroblock to be encoded to form the "difference" macroblock. The encoder uses tools to compress the difference macroblock that are essentially similar to the tools used to compress an intra macroblock.

The type of a picture determines the methods of motion compensation that can be used. The encoder chooses from among these methods for each macroblock in the picture. A method of motion compensation is described by the macroblock mode and motion compensation mode used. There are four macroblock modes, intra (I) mode, forward (F) mode, backward (B) mode, and interpolative forward-backward (FB) mode. For I mode, no motion compensation is used. For the other macroblock modes, 16×16 (S) or 16×8 (E) motion compensation modes can be used. For F macroblock mode, dual-prime (D) motion compensation mode can also be used. We refer to the combination of macroblock mode an motion compensation mode used by a macroblock as the motion compensation "method"; there are seven such methods in MPEG-2: F/S, B/S, FB/S, F/E, B/E, FB/E and F/D. These methods will all be described below.

A macroblock in any picture can be compressed with I macroblock mode. This is the only macroblock mode available in an I picture, and does not use motion compensation.

F macroblock mode can be used in a P or B picture but not in an I picture. When F macroblock mode is used, the predictive macroblock is formed from the most recently decoded top and bottom fields from anchor pictures that are to be displayed before the current picture (the previous anchor frame). Note that when field pictures are used, the previous frame may consists of two fields that are not displayed consecutively; if a frame is being compressed as two field-structured P pictures, then the previous frame used for the second field is the first field of the current frame and the last decoded field of opposite parity from the last anchor picture, so there may be many B pictures in between the two fields of the previous frame.

B or FB macroblock mode can be used in a B picture but not in I or P pictures. When B macroblock mode is used, the predictive macroblock is formed from the two most recently decoded anchor fields that are to be displayed after the current picture (the future anchor frame). When FB macroblock mode is used, the predictive macroblock is formed from the future anchor frame and the previous anchor frame.

The method of motion compensation that uses F macroblock mode and S motion compensation mode (F/S) can be described as follows. The encoder sends a single vector in the bit stream. In a frame-structured picture, this vector is used to generate a set of indices in the previous frame, and the predictive macroblock is the 16×16 region located at those indices. In a field-structured picture, the vector is used to generate a set of indices in one of the fields from the previous frame, and the predictive macroblock is the 16×16 region located at those indices. The encoder sends one bit to indicate which of the fields in the previous frame should be used to generate the predictive macroblock.

The B/S method of motion compensation is the same as the F/S method, except that the future frame, rather than the previous frame, is used in generating the predictive macroblock.

The method of motion compensation that uses F macroblock mode and E motion compensation mode (F/E) can be described as follows. The encoder sends two vectors in the bit stream. Each vector is used to form a 16×8 array of pixels from one of the fields in the previous frame. Two bits are sent to indicate which field of the current frame is to be used with each vector. In a frame-structured picture, the predictive macroblock is formed by interleaving these two arrays; the first array provides the even lines of the predictive macroblock and the second array provides the odd lines. (Each array is used for different fields in the predictive macroblock). In a field-structured picture, the first array is used for the first eight lines of the predictive macroblock and the second array is used for the last eight lines.

The B/E method of motion compensation is the same as the F/E method, except that the future frame, rather than the previous frame, is used in generating the predictive macroblock.

The F/D method can only be used in P pictures, and only if there are no B pictures that are displayed in between the current picture and either field of the previous frame. For the F/D method, the encoder sends two vectors, a same-parity vector and a delta vector. These vectors are used to generate two macroblocks which are then averaged to form the predictive macroblock.

In field-structured pictures, the first macroblock is obtained by using the same-parity vector to construct a macroblock from the same-parity field (i.e., from the top field if the current picture is the top field of a frame or the bottom field if the current in the picture is a bottom field) in the same way that a vector is used to construct the predictive macroblock for the F/S method. A second vector is then obtained from the same-parity vector and the delta vector with rules described in the MPEG-2 standard. This second vector is used to construct the second macroblock from the other field (the off-parity) field in the previous frame in the same way that a vector is used to construct the predictive macroblock for the F/S method. In frame-structured pictures, each macroblock that is used (in averaging) to obtain the predictive macroblock for the F/D method is obtained in the following manner. Two vectors are used to construct each macroblock in the same way that two vector are used to construct the predictive macroblock for the F/E method.

The data used to construct the first macroblock comes from the top field of the previous frame, and the data used to construct the second macroblock comes from the bottom field of the previous frame. The first vector used for the first macroblock is the same-parity vector, and the second vector is derived from the same parity vector and the delta vector. The first vector used for the second macroblock is derived from the same parity vector and the delta vector, and the second vector is the same-parity vector.

The FB/S method of motion compensation works as follows. The encoder sends two motion vectors, a forward vector and a backward vector. The forward vector is used to construct a macroblock from the previous frame the same way a vector is used to form the predictive macroblock for the F/S method of motion compensation, and the backward vector is used to construct a macroblock from the future frame the same way a vector is used to form the predictive macroblock for the B/S method of motion compensation. These two macroblocks are averaged to form the predictive macroblock.

The FB/E method of motion compensation works as follows. The encoder sends four motion vectors, two forward vectors and two backward vectors. The forward vectors are used to construct a macroblock from the previous frame the same way two vectors are used to form the predictive macroblock for the F/E method of motion compensation, and the backward vectors are used to construct a macroblock from the future frame the same way two vectors are used to form the predictive macroblock for the B/E method of motion compensation. These two macroblocks are averaged to form the predictive macroblock.

The vectors sent for any mode of motion compensation can be in half-pixel units. In the case of the F/S, F/E, B/S and B/E methods of motion compensation, spatial interpolation is used to generate the predictive macroblock when the vectors used are in half-pixel units. In the case of the FB/S, FB/E and F/D methods, spatial interpolation is used to generate the macroblocks that are averaged to make the predictive macroblock when the vectors used are in half-pixel units.

The F/D, FB/S and FB/E methods of motion compensation all rely on a technique called temporal interpolation. The predictive macroblock is generated by "averaging" macroblocks constructed from data in two different fields or frames. Here, averaging is to be understood as adding the macroblocks together on a pixel by pixel basis, dividing each pixel by two, and rounding up to the nearest integer.

Motion compensation requires some means for modeling and estimating the motion in a scene to determine the method of motion compensation and motion vectors to be used. One method that an encoder may use is to examine all legal combinations of vectors and motion compensation methods, calculate a figure of merit for each combination, and choose the combination with the greatest figure of merit. An example of a figure of merit is the additive inverse of the norm of the difference macroblock that would be used by a particular combination of motion compensation method and motion vectors. Because this method (exhaustive search) is computationally intensive, it is rarely used in practice.

Aside from the need to code side information relating to the MB mode used to code each MB and any motion vectors associated with that mode, the coding of motion-compensated macroblocks is very similar to that of intra-mode MBs. Although there is a small difference in the quantization, the model of division by $w_{mn}$ times QP still holds.

The MPEG-2 algorithm can be used with fixed bit-rate transmission media. However, the number of bits in each picture will not be exactly constant, due to the different types of picture processing, as well as the inherent variation with time of the spatio-temporal complexity of the scene being coded. The MPEG-2 algorithm uses a buffer-based rate control strategy to put meaningful bounds on the variation allowed in the bit-rate. A Video Buffer Verifier (VBV) is devised in the form of a virtual buffer, whose sole task is to place bounds on the number of bits used to code each picture so that the overall bit-rate equals the target allocation and the short-term deviation from the target is bounded. This rate control scheme can be explained as follows. Consider a system consisting of a buffer followed by a hypothetical decoder. The buffer is filled at a constant bit-rate with compressed data in a bit stream from the storage medium. Both the buffer size and the bit-rate are parameters which are transmitted in the compressed bit stream. After an initial delay, which is also derived from information in the bit stream, the hypothetical decoder instantaneously removes from the buffer all of the data associated with the first picture. Thereafter, at intervals equal to the picture rate of the sequence, the decoder removes all data associated with the earliest picture in the buffer.

In order that the bit stream satisfy the MPEG-2 rate control requirements, all the data for each picture is made available within the buffer at the instant it is needed by the decoder and the buffer never overflows. This availability requirement usually translates to upper and lower bounds on the number of bits allowed in each picture. The upper and lower bounds for a given picture depend on the number of bits used in all the pictures preceding it. It is the function of the encoder to produce bit streams which satisfy this requirement. To meet this requirement, a rate control algorithm may rely on knowledge of the norm of the difference macroblock (hereafter, the prediction error) for each macroblock. An example of such a rate control algorithm is described in the U.S. Pat. No. 5,213,484 by Gonzales and Viscito, which is incorporated by reference herein as if printed in full below.

FIG. 4 is a block diagram of a simplified view of a conventional MPEG-2 encoder. Because MPEG-2 encoding is generally known in the art, we have not drawn all of the components of an MPEG-2 encoder, but instead concentrated on the major components and those that are needed to understand the aspects of this invention. In particular, we show the following components of an MPEG-2 encoder: frame memory 401, motion estimation unit 402, rate control unit 403, motion compensation unit 413, transformation unit 414, quantisation unit 415, variable length encoder unit (419), and output buffer 421. The input to the video encoder of FIG. 4 is the signal 409, containing the Y, Cb and Cr pixel data. The output is the compressed bit stream 422.

For the encoder of FIG. 4, the input pixel data is stored in the frame memory. The motion estimation unit 402 does motion estimation for each macroblock. In particular, for each macroblock the motion estimation unit decides which macroblock mode (I,F,B,FB) and which motion compensation mode (E,S,D) will be used, which motion vector(s) will be used, and an estimate of how precise the effective the motion compensation is (that is, how well the predictive macroblock matches the macroblock to be encoded.) This estimate and the mode and vector decisions are then sent to the rate control unit as signal 427. It is the function of the rate control unit to determine the value of Qp to be used in each macroblock. This determination is made based on the information from the motion estimation unit (signal 427) and the fullness of the output buffer (signal 423). (The operation of the output buffer will be described below.) An example of such a rate control unit can be found in U.S. Pat. No. 5,231,484.

The motion estimation sends the macroblock mode, motion compensation mode and motion vector(s) as signal 412 to the motion compensation unit. This signal, together will pixel data retrieved from the frame memory as signal 411 is used by the motion compensation unit to compute difference macroblock, which is sent as the signal 426 to the transform unit.

The transform unit segments the difference macroblock (signal 426) into 8×8 blocks and computes the DCT of each block. These are sent as the signal 425 to the quantisation unit 415.

The quantisation unit 415 quantises each DCT coefficient based on the quantisation parameter Qp sent as signal 417 from the rate control unit. These quantised DCT coefficients are sent as the signal 424 to the variable length encoder unit.

For each macroblock, the variable length encoder unit produces a compressed representation of the quantised DCT coefficients (signal 424 from the quantisation unit) the macroblock mode, motion compensation mode and motion vectors (signal 416 from the motion estimation unit) and Qp (signal 418 from the rate control unit). The compressed macroblock is sent as the signal 420 to the output buffer 421.

The output buffer receives the compressed representation of each macroblock from the variable length encoder as signal 420. It then sends out the bits that it has received on a first come, first serve basis as the signal 422. A signal indicating the fullness of the output buffer is sent as signal 423 to the rate control unit. (The rate control unit will in general respectively increase or decrease the value of Qp for future macroblocks if the output buffer is respectively nearly full or nearly empty.)

In "ISO-IEC/JTC1/SC29/WG11 Coded Representation of Picture and Audio Information: Test Model 5, Draft, 1993", a conventional motion estimation unit is described. We will now describe a motion estimation method similar to the method described in that reference. For each method of motion compensation (F/S, F/E, B/S, B/E, FB/S, FB/E, F/D), a candidate vector (or vector set) is chosen. The method that has the smallest "prediction error" is chosen as the method to use for that macroblock, and the candidate vector (or vector set) previously chosen for that method is the vector (or vector set) that will be used. A prediction error is a number that indicates the degree to which the predictive macroblock does not match the current macroblock (the macroblock being encoded). By way of example, a conventional motion estimation unit that always uses the "one-norm" of the difference macroblock as the prediction error is described. The one norm of a set of numbers is the sum of the absolute value of those numbers. Thus if we denote the pixel in row i and column j of a predictive macroblock as a(i,j) and the pixel in row i and column j of the current macroblock as c(i,j), then the one-norm of the difference macroblock, $\Delta_a$, is:

$$\Delta_a = \sum_{i=0}^{15} \sum_{j=0}^{15} |a(i,j) - c(i,j)|$$

For each method that does not use temporal interpolation (F/S, F/E, B/S and B/E), each vector (or vectors) in a given range are examined. For each vector (or vectors) the prediction error is computed. For each method, the vector or vector set that give the smallest prediction error is chosen as the candidate vector or vector set. For the FB/S method, candidate vectors are the same vectors chosen as candidates for the F/S and B/S method. A separate computation is done to compute the prediction error for the FB/S method with the given candidate vectors. For the FB/E method, candidate vectors are the same vectors chosen as candidates for the F/E and B/E method. A separate computation is done to compute the prediction error for the FB/E method with the given candidate vectors. For the F/D method, all of the candidate vectors chosen for the F/E method of motion compensation are examined as potential same-parity vectors, and all legal combination of these vectors with off-parity vectors are examined. The combination that has smallest prediction error is chosen as the candidate F/D vector set.

After a vector (or vector set) has been chosen for each method, the method and candidate vector (or set) with the smallest one-norm is chosen, and the one-norm of the prediction norm for that method and vector (or set) is the prediction error for the macroblock. (The vector or vector set and method are sent to the motion compensation unit and variable length encoder unit, and the prediction error is sent to the rate control unit.)

A block diagram of the just described conventional motion estimation unit is shown in FIG. 9. This motion estimation unit stores the previous anchor frame in memory unit 901, the future anchor frame in memory unit 903, and the current frame in memory unit 902. The unidirectional motion estimator unit 904 computes candidate motion vectors and prediction errors for all of the methods that use F/E and F/S method; it does these computations by reading pixel data from the memory unit 901 through link 908 and by reading from memory unit 902 through link 909. The unidirectional motion estimator unit 905 computes candidate motion vectors and prediction errors for all of the method that use B/E and B/S method; it does these computations by reading pixel data from the memory unit 903 through link 919 and by reading from memory unit 902 through link 910.

The candidate motion vectors computed by the unidirectional motion estimator units 904 and 905 are sent to the interpolative motion error computation unit 906 through links 911 and 912. For these candidate vectors, the interpolative motion error computation unit computes prediction errors for FB/S and FB/E methods. Also, from the F/E candidate vectors the interpolative motion error computation unit computes candidate F/D vector sets and prediction errors. The computations performed by the interpolative motion error computation unit are performed by reading pixel data from memory units 901, 902, and 903 by using, respectively, links 917, 920 and 918.

The interpolative motion error computation unit 906 and the unidirectional motion estimator units 904 and 905 send candidate vectors and prediction errors to the final motion decision unit 907, which chooses the macroblock mode, motion compensation mode, and motion vector(s), and also determines the prediction error for the macroblock. This information is sent out through link 916.

b. PREFERRED EMBODIMENT OF AN ENCODER

An overview of a coding method in accordance with the principles of the present invention will first be described by reference to FIG. 10.

In step 1002, a digitized picture is input into the encoder. In step 1004 the encoder divides the picture into a plurality of regions; steps 1006–1014 are then performed on each of these regions.

In step 1006, the encoder determines the motion compensation method, motion vector or motion vector set, and prediction error for the region. It does this by comparing the region to regions in other pictures to determine motion vectors and prediction errors for each unidirectional method. For interpolative methods, it computes separate prediction errors for the regions to be averaged to form the prediction and computes an estimate for the prediction error of the interpolative method based on those prediction errors. It then chooses the motion compensation method and vector or vector set that will be used.

In step 1008, the encoder computes a difference region for each region; i.e., it computes the difference between the region and the predictive region based on the motion compensation method and vector or vector set chosen in the last step.

In step 1010, the encoder sets the quantisation level (chooses Qp) for the region. This is done by seeing how many bits have been produced so far and previously computed prediction errors.

In step 1012, the region is divided into subregions. Each subregion is subjected to a transform, and the transform coefficients are quantised.

In step 1014, the encoder variable length encodes the quantised transform coefficients, the motion compensation method, motion vectors or set of motion vectors and quantisation level (Qp).

In step 1016, the encoder transmits the variable length encoded information to the decoder.

The video encoder that is the object of this invention is an encoder of the form shown in FIG. 4 with a motion estimation unit as shown in FIG. 5. The operation of the motion estimation unit of FIG. 5 can be described as follows.

This motion estimation unit stores the previous anchor frame in memory unit 501, the future anchor frame in memory unit 503, and the current frame in memory unit 502. The unidirectional motion estimator unit 504 computes candidate motion vectors and prediction errors for the F/E and F/S methods; it does these computations by reading pixel data from the memory unit 501 through link 508 and by reading from memory unit 502 through link 509. The unidirectional motion estimator unit 505 computes candidate motion vectors and prediction errors for the B/E and B/S methods; it does these computations by reading pixel data from the memory unit 503 through link 519 and by reading from memory unit 502 through link 510. The candidate motion vectors and prediction errors computed by the unidirectional motion estimator units 504 and 505 are sent to the unidirectional to interpolative motion estimator 506 through links 511 and 512. For these prediction errors the unidirectional to interpolative motion estimator computes estimates of the prediction errors for FB/S and FB/E methods.

For one or more F/D vector sets, the unidirectional motion estimator 504 computes the prediction error for each macroblock that would be averaged to form the F/D predictive macroblocks and sends these errors to the unidirectional to interpolative motion estimator unit, which computes an estimate for the prediction error for each F/D vector set from these errors.

In summary, for the FB/S, FB/E and F/D methods, the unidirectional to interpolative motion estimator unit computes an estimate of the prediction error based on the two prediction errors associated with the macroblocks that are averaged to form the predictive macroblock for those methods.

The unidirectional to interpolative motion estimator unit 506 and the unidirectional motion estimator units 504 and 505 send candidate vectors and prediction errors to the final motion decision unit 507, which chooses the macroblock mode, motion compensation mode, and motion vector(s), and also determines the prediction error for the macroblock. This information is sent out through link 516.

The difference between the conventional motion estimator (FIG. 9) and the motion estimator that is the subject of this invention (FIG. 5), is that whereas the motion estimator in FIG. 9 has an interpolative motion error computation unit that explicitly computes prediction errors for interpolative methods, the motion estimation unit of FIG. 5 has a unidirectional to interpolative motion estimator that only estimates these prediction errors. Thus, the motion estimator of FIG. 5 may be smaller, cheaper and/or use less power.

Returning to the previous example of using the one-norm of the difference macroblock as the "prediction error", we can describe the difference between a conventional motion estimation unit and the unit described in this invention as follows.

Let the luminance components of the two macroblocks to be averaged for a particular method of motion compensation be a (i,j) and b(i,j), and let the luminance pixels of the current macroblock be c(i,j), where i and j range from zero to fifteen. The prediction errors for a and b are:

$$\Delta_a = \sum_{i=0}^{15} \sum_{j=0}^{15} |a(i,j) - c(i,j)|$$

and $$\Delta_b = \sum_{i=0}^{15} \sum_{j=0}^{15} |b(i,j) - c(i,j)|$$

Let av(x,y) be the temporal averaging function that MPEG-2 uses; av(x,y) is (x+y)/2 rounded up to the nearest integer. The actual one-norm prediction errors for the temporal interpolative method is:

$$\Delta = \sum_{i=0}^{15} \sum_{j=0}^{15} |av(a(i,j),b(i,j)) - c(i,j)|$$

In accordance with an embodiment of the present invention, an estimate of $\Delta$ is computed that can be written in a generic fashion as:

$$\delta = f(\Delta_a, \Delta_b)$$

where f is some function. The form of the function depends on the embodiment of unidirectional to interpolative motion estimator.

Thus, whereas a conventional motion estimation unit computes the actual prediction error $\Delta$, the motion estimation unit computes only an estimate, $\delta$, which is computed from $\Delta_a$ and $\Delta_b$.

FIG. 6 shows a first embodiment of a unidirectional to interpolative motion estimator. The unidirectional to interpolative motion estimator of FIG. 6 receives two input signals, 606 and 607, and produces an output signal 612. The two input signals are unidirectional prediction errors, and the output signal is an estimate of the interpolative prediction error. The input signals 606 and 607 are sent to squaring circuits 601 and 602 to produce the signals 608 and 609. The respective outputs of these squaring circuits are the squares of their respective inputs; i.e., if we denote the signal 606 by $\Delta_a$ and signal 607 by $\Delta_b$, then signals 608 and 609 are equal to $\Delta_a^2$ and $\Delta_b^2$. These two signals are sent to an adder 603, which produces an output signal 610 equal to the sum of its inputs i.e equal to $\Delta_a^2 + \Delta_b^2$. This signal is sent to a square rooting circuit 604, which produces an output signal 611 equal to the square root of its input; i.e., equal to:

$$\sqrt{\Delta_a^2 + \Delta_b^2}$$

This signal is sent to a scaler 605, which produces the final output 612 equal to the product of a constant $c_1$ and its input; i.e., equal to:

$$c_1 \times \sqrt{\Delta_a^2 + \Delta_b^2}$$

FIG. 7 shows a second embodiment of a unidirectional to interpolative motion estimator. The unidirectional to interpolative motion estimator of FIG. 7 receives two input signals, 710 and 711, and produces an output signal 717. The two input signals are unidirectional prediction errors, and the output signal is an estimate of the interpolative prediction error. The input signals 710 and 711 are sent to squaring circuits 701 and 702 to produce the signals 712 and 713. The respective outputs of these squaring circuits are the squares of their respective inputs; i.e., if we denote the signal 710 by $\Delta_a$ and signal 711 by $\Delta_b$, then signals 712 and 713 are equal to $\Delta_a^2$ and $\Delta_b^2$. The signals 710 and 711 are also sent to a multiplier 703, which produces an output 714 equal to the product of its inputs; i.e., equal to $\Delta_a \times \Delta_b$. The signals 710 and 711 are also sent to an adder 704, which produces an output 715 equal to the sum of its inputs; i.e., equal to $\Delta_a + \Delta_b$. The signals 712, 713 and 714 are sent to an adder 706, which produces an output 716 equal to the sum of its three inputs; i.e., equal to $\Delta_a + \Delta_b + \Delta_a \times \Delta_b$. The signal 715 is sent to an offset adder, which produces as its output 718 the sum of its input and a constant $c_3$, i.e., equal to $\Delta_a + \Delta_b + c_3$. The signals 716 and 718 are sent to a divider, which produces an output 708 equal to the quotient of the signal 716 and the signal 718; i.e., equal to:

$$\frac{\Delta_a^2 + \Delta_b^2 + \Delta_a \times \Delta_b}{\Delta_a + \Delta_b + c_3}$$

The signal 708 is sent to a scaler 709 which produces as its output a signal 717 equal to the product of its input a constant $c_2$, i.e., equal to:

$$c_2 \times \frac{\Delta_a^2 + \Delta_b^2 + \Delta_a \times \Delta_b}{\Delta_a + \Delta_b + c_3}$$

An embodiment of the final motion decision unit of FIG. 5 (507) is shown in FIG. 8. The final motion decision unit shown in FIG. 8 receives as its input 2n signals, where n is the number of motion compensation methods allowed in a macroblock. Half of these input signals, 803_1, 803_2, . . . 803_n are the motion vectors or motion vector sets for each method, and the other half, 804_1, 804_2, . . . 804_n are the prediction errors for each method. The signals 803_1, 803_2, . . . 803_n are sent, respectively, to bit production calculators, 801_1, 801_2 . . . 801_n, which produce as output signals 807_1, 807_2 . . . 807_n the number of bits that the variable length encoder (419 in FIG. 4) would use to encode the motion vectors that are the respective inputs to the bit production calculators. The signals 807_1, 807_2, . . . 807_n are sent to scalers 810_1, 810_2 . . . 810_n, which produce outputs 805_1, 805_2 . . . 805_n equal to the product of their respective inputs and a constant d. The signals 805_1, 805_2, . . . 805_n and the input signals 804_1, 804_2 . . . 804_n are sent, respectively, to adders 802_1, 802_2 . . . 802_n, which produce the output signals 806_1, 806_2 . . . 806_n which are equal to the sum of their respective inputs. The signals 806_1, 806_2 . . . 806_n are sent to a minimum detector 808, which determines which of 806_1, 806_2, . . . 806_n is smallest. The minimum detector then chooses the method that corresponds to the smallest of 806_1, 806_2, . . . 806_n as the method that will be used for the macroblock. This information is sent as signal 809.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A video encoder, comprising:
   a motion estimation unit including:
   a unidirectional motion estimator for computing motion vectors and prediction errors for each of a plurality of regions in a picture to be encoded,
   a unidirectional to interpolative motion estimator, coupled to the unidirectional motion estimator, for computing a prediction error estimate for at least one interpolative motion compensation method from the prediction errors; and,
   a final motion decision unit, coupled to the a unidirectional motion estimator and the unidirectional to interpolative motion estimator, for selecting for each region of the picture, the motion compensation method and at least one motion vector for use in encoding of the region of the picture.

2. The video encoder of claim 1 further including, a frame memory, connected to receive and store source video data including the picture to be encoded and connected to provide the picture to be encoded to the unidirectional motion estimator.

3. The video encoder of claim 1, wherein the unidirectional to interpolative motion estimator comprises:
   a squaring unit connected to receive the prediction errors from the unidirectional motion estimator and for outputing square values;
   an adder, connected to receive at least some of the square values and for outputing a sum;
   a square rooting unit connected to receive the and compute a square route of the sum; and
   a scaler, to compute the product of a constant and the output of the square rooting unit.

4. The video encoder of claim 1, wherein the unidirectional to interpolative motion estimator comprises:
   a squaring unit connected to receive the prediction errors from the unidirectional motion estimator and for outputing square values;
   a multiplier connected to receive subsets of the prediction errors from the unidirectional motion estimator, for computing a product of each of the subsets;
   a first adder connected to receive the subsets of the prediction errors from the unidirectional motion estimator, for computing a sum of each of the subsets;
   an offset adder for computing a sum of a first fixed constant and the output of the first adder;
   a second adder for computing the sum of the outputs of the squaring unit and the multiplier;
   a divider for computing a quotient of the output of the second adder and the offset adder; and
   a scaler for computing a product of the output of the divider and a second fixed constant.

5. The video encoder of claim 1, wherein the final motion decision unit comprises:
   bit production calculation mean for determining for each motion compensation method and motion vector set a number of bits that would be used to encode the motion vector set for that method;
   scaler means for computing a product of each output of the bit production calculator means and a fixed constant;
   adder means for computing for each motion compensation method and motion vector set the sum of the prediction error and the product of the output of the bit production calculator means and fixed constant, and;
   minimum detector means for selecting the motion compensation method and motion vector set for the region by choosing the candidate motion compensation method and motion vector set whose corresponding adder has the smallest sum.

6. The video encoder of claim 1 wherein the final motion decision unit also selects an estimated prediction error for each region of the picture.

7. The video encoder of claim 6 further comprising a rate control means, coupled to the final motion decision unit, for setting quantisation levels responsive to at least one estimated prediction error received from the final motion decision unit.

8. A method for motion estimation for use in conjunction with video encoding, comprising the steps of:

computing, for at least one unidirectional motion compensation method, a motion vector set and a prediction error for each of a plurality of regions in a picture to be encoded, computing, from the prediction errors, an estimate for at least one interpolative motion compensation method; and, responsive to the prediction errors and estimated prediction errors, selecting for each region of the picture, the motion compensation method and at least one motion vector for use in encoding.

9. The method of claim 8 comprising the further step of selecting an estimated prediction error for each region of the picture.

10. The method of claim 8 comprising the further step of setting quantisation levels resposive to at least one estimated prediction error.

* * * * *